United States Patent [19]

Sommer et al.

[11] 4,250,082

[45] Feb. 10, 1981

[54] PROCESS FOR THE PREPARATION OF A PULVERULENT FILLED RUBBER

[75] Inventors: Neithart Sommer; Karl-Heinz Nordsiek; Jürgen Ehrlich, all of Marl, Fed. Rep. of Germany

[73] Assignee: Chemische Werke Huls Aktiengesellschaft, Marl, Fed. Rep. of Germany

[21] Appl. No.: 38,752

[22] Filed: May 14, 1979

[30] Foreign Application Priority Data

May 20, 1978 [DE] Fed. Rep. of Germany ....... 2822148

[51] Int. Cl.$^3$ .............................................. C08J 3/20
[52] U.S. Cl. ............................... 260/42.55; 260/42.13
[58] Field of Search ........................... 260/42.13, 42.55

[56] References Cited

U.S. PATENT DOCUMENTS

| | | | |
|---|---|---|---|
| 2,948,701 | 8/1960 | Baker et al. | 260/42.55 X |
| 3,767,605 | 10/1973 | Gerlicher | 260/42.55 X |
| 3,846,365 | 11/1974 | Berg et al. | 260/42.37 X |
| 3,895,035 | 7/1975 | Berg et al. | 260/42.55 X |
| 3,920,604 | 11/1975 | Berg et al. | 260/42.54 |
| 3,922,240 | 11/1975 | Berg et al. | 260/42.55 X |
| 3,929,707 | 12/1975 | Berg et al. | 260/42.55 X |
| 3,945,978 | 3/1976 | Berg et al. | 260/42.55 X |
| 4,073,755 | 2/1978 | Berg et al. | 260/42.55 X |
| 4,138,375 | 2/1979 | Berg et al. | 260/42.47 X |

FOREIGN PATENT DOCUMENTS 697890  11/1964  Canada ................................. 260/42.55

*Primary Examiner*—Lewis T. Jacobs
*Attorney, Agent, or Firm*—Millen & White

[57] ABSTRACT

A process for the precipitation of a pulverulent filled rubber, which comprises mixing a rubber latex, a rubber solution or a rubber emulsion with a filler suspension, waterglass and a water-soluble aluminum salt at a predetermined pH value of 3.0–3.7, the pH value being kept constant by introduction of acid during the precipitation.

8 Claims, No Drawings

PROCESS FOR THE PREPARATION OF A PULVERULENT FILLED RUBBER

BACKGROUND OF THE INVENTION

Over the course of more than a decade, numerous publications have appeared, and numerous patent applications have been filed, relating to the objective and usefulness of utilizing rubber powders, and to possible processes for their preparation.

The reason for the constantly increasing interest in pulverulent rubbers is readily understandable in view of the current state of the processing technology of the rubber industry. The situation is that, to this day, rubber mixtures are produced with high expenditure of time, heat energy consumption and high personnel requirements. The main reason for this is that the rubber raw material is provided in the form of bales.

The comminution of the bales and the intimate mixing with fillers, mineral oil plasticizers and vulcanization auxiliaries are carried out on mills or in internal mixers. To avoid deterioration of quality, the mixture is prepared in several process steps. In general, the mixture is stored between these steps. The internal mixers or mills are followed by extruder-pelletizers or extruder-roller dies.

Only a completely novel processing technology can lead away from this highly unsatisfactory and expensive rubber processing technique. In the course of recent years, the use of free-flowing rubber powders has therefore been discussed increasingly. These offer the possibility of processing rubber mixtures in a simple and rapid manner, like thermoplastic powders.

Very recently, several ways of preparing pulverulent free-flowing rubber-filler mixtures, preferably rubber-carbon black mixtures, based on all-purpose rubbers, have been found and described (compare German Patent Applications P 21 35 266.9 [U.S. Pat. No. 3,846,365], P 22 14 121.5 [U.S. Pat. No. 3,895,035], P 22 60 340.3 [3,920,604], P 23 24 009.7 [U.S. Pat. No. 3,945,978], P 23 25 550.7 [U.S. Pat. No. 3,922,240], P 23 32 796.0 [U.S. Pat. No. 3,929,707], P 24 39 237.8 [U.S. Pat. No. 4,073,755] and P 26 54 358.8 [U.S. Pat. No. 4,138,375]). The essential characteristics of the prior art processes described in these applications are the use of particular surface-active compounds and the use of an expensive, at times multi-stage, precipitation technique.

However, as mentioned, the main object of using powder rubbers is to improve the economics of rubber processing. Thus, the foregoing processes do not meet the precondition for the success of such endeavors, i.e., the inexpensive preparation of rubbers in powder form.

SUMMARY OF THE INVENTION

Accordingly, it is an object of the present invention to provide a novel, simple and economical process for the preparation of a pulverulent filled rubber, and the rubber produced thereby.

Upon further study of the specification and appended claims, further objects and advantages of this invention will become apparent to those skiled in the art.

These objects have been achieved by providing a process for the precipitation of a pulverulent filled rubber, which comprises mixing a rubber latex, a rubber solution or a rubber emulsion with a filler suspension, waterglass and a water-soluble aluminum salt at a predetermined pH value of 3.0-3.7, the pH value being kept constant by introduction of acid during the precipitation. The product thereof is also an aspect of this invention.

DETAILED DISCUSSION

It was surprising that the precipitation of the filled rubber per this invention, thereby circumventing the preparation of a stable mixture of the rubber latex, rubber solution or rubber emulsion and filler suspension, should lead to a pulverulent filled rubber. Such a stable mixture of rubber latex, rubber solution or rubber emulsion and filler suspension, as described in the patent applications listed above, was hitherto an unavoidable precondition for obtaining pulverulent filled rubbers by subsequent precipitation of this stable mixture with a precipitation liquor.

In order to prepare the stable mixture at all, it was necessary to use a number of emulsifiers, dispersants and protective colloids. Since now the stable mixture can be circumvented, it is also unnecessary to employ these auxiliaries. Thus, the process according to this invention is surprisingly simple and economical.

Suitable rubber latices for use in this invention are fully conventional. They include, on the one hand, those which are conventionally prepared from natural rubber and, on the other hand, those from homopolymers and copolymers of conjugated dienes, such as can be conventionally prepared by radical polymerization using an emulsifier, in accordance with known processes of the prior art (see, for example, Houben-Weyl, Methoden der organischen Chemie (Methods of Organic Chemistry), volume XIV/1 (1961), "Manufacture of Rubbers", page 712 et seq.; Ullmanns Enzyklopädie der technischen Chemie (Ullmann's Encyclopedia of Industrial Chemistry), volume 9 (1957), pages 325 to 339, and German Patent Specifications 679,587, 873,747 and 1,130,597, all of which are incorporated by reference herein). Suitable conjugated dienes include 1,3-butadiene, isoprene, piperylene, 2-chloro-1,3-butadiene, 2-methyl-1,3-butadiene, 2,3-dichloro-1,3-butadiene and 2,3-dimethyl-1,3-butadiene. The copolymers can be prepared both from mixtures of these conjugated dienes and from mixtures of these conjugated dienes with vinyl compounds, such as, for example, styrene, $\alpha$-methylstyrene, acrylonitrile, acrylic acid, methacrylic acid and vinylpyridine. Preferably, a styrene-butadiene latex in which the proportion of styrene is from 15 to 30 percent by weight is employed in the process of this invention.

The solids content of these conventional latices is in general 20 to 25 percent by weight.

Suitable rubber solutions for use in the process of this invention are also fully conventional. They include, preferably, those obtained upon solvent polymerization of synthetic rubbers in accordance with known processes, for example, polybutadienes, polyisoprenes, copolymers of butadiene and styrene, ethylene-propylene copolymers, ethylene-propylene-diene terpolymers and polyalkenamers which are formed by ring-opening polymerization of cycloolefins (Elastomer Stereospecific Polymerization, B. L. Johnson, M. Goodman, Advances in Chemistry Series 52, American Chemical Society 1966).

As is known, organo-metallic compounds, such as, for example, Ziegler-Natta catalysts, lithium catalysts or alfin catalysts are used in the preparation of these rubbers, the choice of the particular catalyst depending on the nature of the monomers and on the desired properties of the polymers. Solvents used for the polymerization include both aliphatic hydrocarbons, such as, for example, pentane, hexane and heptane, are aromatic hydrocarbons, such as, for example, benzene.

On the other hand, the rubber can also be brought into solution by dissolving it in one of such conventional solvents.

The solids content of these conventional rubber solutions is in general 3 to 35 percent by weight.

The rubber emulsions which can be employed in the process according to this invention are also fully conventional and can be prepared from the above-mentioned rubber solutions in accordance with known processes of the prior art (see, for example, Houben-Weyl, Methoden der organischen Chemie (Methods of Organic Chemistry), volume I/2 (1961), "Emulsification and Emulsifiers", page 129 et seq., which is incorporated by reference herein).

The solids content of these conventional rubber emulsions is in general from 5 to 30 percent by weight.

Using the process according to this invention it is also possible to prepare pulverulent filled rubbers which consist not only of a single rubber but of mixtures of two or more different rubbers.

For this purpose, the rubber latices, the rubber solutions or the emulsions of the rubber solutions are mixed and processed in accordance with this invention to give pulverulent filled rubbers.

Suitable fillers include, preferably, the carbon blacks, of all levels of activity, customary in the rubber industry, such as, for example, SAF, ISAF and HAF carbon blacks, including their modified versions, namely, FEF, GPF, APF, SRF and MT carbon blacks. However, other conventional mineral substances, such as, for example, highly active silica ($SiO_2$), kaolin and slate powder can also be incorporated.

Suitable amounts of carbon black to be employed in the process are 20 parts by weight—400 parts by weight per 100 parts by weight of rubber, preferably 50 parts by weight—150 parts by weight per 100 parts by weight of rubber. Suitable amounts of mineral substances are 20 parts by weight—500 parts by weight per 100 parts by weight of rubber, preferably, 30 parts by weight—150 parts by weight per 100 parts by weight of rubber. Combinations of carbon blacks with white fillers, within the limits stated for the individual components, are also possible.

The filler suspensions are in general prepared by suspending the filler or fillers in water and then dispersing the suspension in a commercial, so-called emulsifying or dispersing apparatus until the individual filler particles have a mean particle diameter of <0.1 μm, preferably <0.06 μm, e.g., 0,01–0.1 μm, preferably 0,03–0,06 μm. The solids content of these suspensions is generally 2–10 percent by weight.

A suitable waterglass is a sodium silicate solution in which the molar ratio, $Na_2O:SiO_2$, is 2:1–1:4. The amount of silica, calculated as $SiO_2$, to be liberated from the waterglass in the course of the process should be from 0.5 to 6 percent by weight, preferably from 1 to 4 percent by weight, based on the total amount of rubber. The concentration of the sodium silicate in such solutions is generally 0,03–1,5 weight percent.

In addition to waterglass, a water-soluble aluminum salt, preferably aluminum sulphate, is employed in the process according to this invention, in an amount of from 0.5 to 8 percent by weight, preferably from 1 to 6 percent by weight, of aluminum, relative to the total amount of rubber. Other suitable salts include aluminum chloride, aluminum chlorate, aluminum formiate and aluminum acetate.

If plasticizer oils are to be incorporated in the product, the refinery products conventionally used for this purpose are employed; these preferably consist of aromatic, naphthenic or paraffinic hydrocarbons, depending on the end use of the vulcanized products. The amount of plasticizer oils to be employed is between 1 and 100 parts by weight per 100 parts by weight of rubber. A procedure which can be followed to prepare a filled rubber containing a plasticizer oil is, for example, to combine the plasticizer oil, in suitable mixing equipment (for example, fluid mixers), with the filled rubber prepared in accordance with the process of this invention.

The overall process typically comprises the following steps. Initially, a filler suspension is prepared. Sufficient mineral acid is added to the latter so that after the subsequent addition of the water-soluble aluminum salt and waterglass, a pH value of about 3.7 is reached. The pH value is then adjusted, by adding further mineral acid, to a value in the range of 3.0–3.7, which is critical for the process. The precise value to which the pH is to be adjusted (i.e., the defined pH value) depends on the amounts of water-soluble aluminum salt and waterglass employed, on the molecular weight of the basic rubber and on the nature and amount of the filler used. A skilled worker is able to determine the proper defined pH value by a few exploratory and routine preliminary experiments.

The pH value in the range of 3.0–3.7 which is decisive for the commencement of precipitation, depends on the amounts of water-soluble aluminum salt and waterglass employed, on the molecular weight of the basic rubber and on the nature and amount of the filler used. It is exactly this critical pH value that has to be adjusted to ensure that; on adding rubber latex (solution or emulsion), the coagulation of rubber (caused by the acid fluid) and the precipitation of aluminum silicates are effected both simultaneously and jointly, thereby making sure that a pulverulent, filler-containing product is obtained.

If on addition of rubber the pH value is too low (<3.0) or too high (>3.7), rubber precipitates in the form of large, lumpy particles since the essential precipitants do not precipitate with the rubber. If the pH value is too low, the aluminum silicates do not precipitate at all and, if the pH value is too high, they precipitate prior to rubber addition.

The customary mineral acids, such as sulphuric acid, phosphoric acid and hydrochloric acid, are used to adjust the pH value. The preferred acid is sulphuric acid. The mineral acids are generally employed as solutions of concentrations of 5–20 percent strength.

The filler suspension thus prepared, which contains the mineral acid, waterglass and a water-soluble aluminum salt, is subsequently combined with a rubber latex, a rubber solution or a rubber emulsion, whereupon immediate precipitation of the filled rubber occurs.

If the ingredients are combined discontinuously, for example, in a stirred kettle, the rubber component (a) should be added, with stirring, to the filler suspension (b) containing the precipitant. If the ingredients are combined continuously, for example, in a two-material nozzle, a dynamic flow-through mixer or a static mixer, the two streams (a) and (b) should be fed simultaneously to the mixing equipment.

In both of these variants of the process, the defined pH value, in the range of 3.0–3.7 which is critical to the process and which has been set up during the preparation of the filler suspension containing the precipitant, is maintained constant by adding mineral acid during the process.

If rubber latices are used, a temperature of 15° to 60° C. during the precipitation process is advantageous. If rubber solutions or rubber emulsions are employed, it is advantageous to maintain, during the precipitation process, a temperature in the vicinity of the boiling point of the rubber solvent, so that the latter is distilled off.

Since it is advantageous to maintain the temperature of the precipitation batch at about the boiling point of the solvent, it is correspondingly advantageous to employ solvents which have boiling points less than that of the medium used to suspend the filler, normally water.

As the concluding stage, the filled rubber is separated from the water and dried with constant agitation.

Vulcanizable finished rubber mixtures can be prepared in a simple manner from the pulverulent filled rubbers prepared in accordance with the present process. This may be accomplished by mixing the rubbers, in conventional modern fluid mixers known from thermoplastics technology, with the conventional adjuvants, such as additional fillers, plasticizer oils, resins, anti-ozone agents and anti-aging agents as well as cross-linking chemicals, the admixture being carried out without generating shearing forces. The direct use of such pulverulent finished rubber mixtures in the final stage of conventional rubber processing methods, with the elimination of heavy mechanical mixing equipment having a high energy requirement, is again feasible in a surprisingly simple and economical manner. In addition, the pulverulent finished mixtures resulting from the products according to this invention can be fed directly into special extruders or into injection molding machines. The output thereby achievable, and the quality of the resulting products, such as, for example, tire tread strips, correspond to the results achieved when using solid rubbers and employing the conventional multi-stage expensive processing technique.

However, even if the conventional process technique of the rubber-processing industry is retained, there are substantial advantages in the use of the pulverulent filled rubbers according to this invention. Thus, it has been found that the preparation of vulcanizable finished rubber mixtures, even containing high proportions of active fillers, is feasible, in a simple and particularly economical manner, in conventional internal mixers. In contrast to the conventional multi-stage mixing technique, a single process step is now used and the running time is reduced to between one-third and one-quarter of the total mixing time usually required, with the energy consumption reduced by about the same extent. At the same time, the output temperatures are only slightly above 100° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, all temperatures are set forth uncorrected in degrees Celsius; unless otherwise indicated, all parts and percentages are by weight.

The pH values mentioned in the examples were measured with a pH meter from Messrs. Metrohm (type E 520). The Mooney values were determined in accordance with DIN 53,523 and the particle sizes in accordance with DIN 53,477.

EXAMPLES 1 to 8

Preparation of pulverulent filled rubbers based on a rubber latex.

(a) Preparation of the aqueous filler suspension

Completely deionized water—the amount being as shown in Table 1—is introduced into a 2 m$^3$ kettle. Filler, of the type and in the amount indicated in Table 1, is introduced while stirring (with an impeller stirrer at 100 rpm). The filler is then worked into a slurry for 10 minutes (at 62 rpm). Thereafter, the filler slurry is dispersed by means of an emulsifying apparatus (Siefer, gap width 0.5 mm) connected to the kettle to form a circulatory system, until the mean particle size is <0.06 μm. During this dispersing time, a distinctly visible increase in viscosity occurs.

(b) Preparation of the pulverulent filled rubber 700 kg of completely deionized water are introduced into a 3 m$^3$ kettle equipped with an impeller stirrer. The filler is then introduced as an aqueous suspension, while stirring (at 50 rpm). Thereafter, the acid (in the form of a 10 percent strength solution), the aluminum sulphate (in the form of a 20 percent strength solution) and the waterglass (in the form of a 26 percent strength solution) are added in the manner, and in the amount, shown in Table 1. The pH is then adjusted with acid to the value shown in Table 1.

431 kg of latex (23.2% solids content), corresponding to 100 kg of rubber, are introduced into this filler suspension/precipitation liquor in the course of 20 minutes, during which precipitation commences. During this period the mixture is stirred at 70 rpm and, at the end of the precipitation, at 100 rpm, and the pH is kept at the value indicated in Table 1 by addition of acid and the temperature at the value indicated in Table 1. While the latex is being introduced, the suspension becomes increasingly more viscous.

After completion of the introduction of the latex, the mixture is stirred for a further 5 minutes (at 50 rpm), after which the product is separated from the water and the rubber powder suspension is dried with constant agitation. Powders which are very free-flowing and store well are obtained, in the amounts indicated in Table 1.

TABLE 1

| Example No. | 1 | 2 | 3 | 4 |
|---|---|---|---|---|
| (a) Preparation of the aqueous filler suspension | | | | |
| Completely deionized water kg | 1425 | 1425 | 1425 | 1425 |
| Filler, type | Carbon black, ASTM No.N-339 | Carbon black, ASTM No.N-339 | Carbon black, ASTM No.N-339 | Carbon black, ASTM No.N-339 |
| kg | 75 | 75 | 75 | 75 |
| parts per hour | 75 | 75 | 75 | 75 |

TABLE 1-continued

| (b) Preparation of the pulverulent filled rubber | | | | | |
|---|---|---|---|---|---|
| Acid | type | Sulphuric acid | Sulphuric acid | Sulphuric acid | Sulphuric acid |
| | kg (100% strength) | 0.5 | 0.5 | 0.5 | 1.0 |
| | parts per hour | 0.5 | 0.5 | 0.5 | 1.0 |
| Aluminum | type | Al sulphate | Al sulphate | Al sulphate | Al sulphate |
| salt | kg (100% strength) | 2 | 2 | 2 | 4 |
| | parts per hour | 2 | 2 | 2 | 4 |
| Waterglass | kg (as $SiO_2$) | 1 | 1 | 1 | 2 |
| | parts per hour (as $SiO_2$) | 1 | 1 | 1 | 2 |
| pH value | | 3.0 | 3.4 | 3.7 | 3.4 |
| Latex based on | | E-SBR containing 23.5% of styrene | E-SBR containing 23.5% of styrene | E-SBR containing 23.5% of styrene | E-SBR containing 23.5% of styrene |
| ML-4 | | 118 | 118 | 118 | 118 |
| Temperature, °C. | | 25 | 25 | 25 | 25 |
| Filled rubber, kg | | 171 | 169 | 173 | 170 |

| Example No. | | 5 | 6 | 7 | 8 |
|---|---|---|---|---|---|
| (a) Preparation of the aqueous filler suspension | | | | | |
| Completely deionized water kg | | 1480 | 1425 | 1050 | 1330 |
| Filler, type | | Carbon black, ASTM No.N-774 | Carbon black, ASTM No. N-339 | Carbon black, ASTM No.N-550 | Silica ($SiO_2$) |
| | kg | 120 | 75 | 55 | 70 |
| | parts per hour | 120 | 75 | 55 | 70 |
| (b) Preparation of the pulverulent filled rubber | | | | | |
| Acid | type | Sulphuric acid | Phosphoric acid | Sulphuric acid | Sulphuric acid |
| | kg (100% strength) | 1.0 | 0.5 | 1.5 | 0.5 |
| | parts per hour | 1.0 | 0.5 | 1.5 | 0.5 |
| Aluminum | type | Al sulphate | Al sulphate | Al sulphate | Al sulphate |
| salt | kg (100% strength) | 4 | 2 | 6 | 2 |
| | parts per hour | 4 | 2 | 6 | 2 |
| Waterglass | kg (as $SiO_2$) | 2 | 1 | 3 | 1 |
| | parts per hour (as $SiO_2$) | 2 | 1 | 3 | 1 |
| pH value | | 3.4 | 3.4 | 3.4 | 3.4 |
| Latex based on | | E-SBR containing 23.5% of styrene | E-SBR containing 23.5% of styrene | Natural latex ("low ammonia") | E-SBR containing 23.5% of styrene |
| ML-4 | | 56 | Blend of ML-4=118 ML=56 in the ratio of 60:40 | 117 | 118 |
| Temperature, °C. | | 25 | 25 | 50 | 25 |
| Filled rubber, kg | | 209 | 169 | 151 | 161 |

EXAMPLE 9 and COMPARISON EXAMPLE A

The technological properties of the pulverulent filled rubbers prepared according to Examples 1 to 4 were characterized as follows:

(a) A finished mixture of the following compositions was prepared in a commercial powder mixer (DIOSNA ® Type V 100) with chopper, useful volume 90 liters:

| | | |
|---|---|---|
| pulverulent filled rubber | 175.0 | parts by weight |
| aromatic plasticizer oil (NAFTOLEN ® MV) | 42.0 | parts by weight |
| Stearic acid | 2.5 | parts by weight |
| Zinc oxide | 4.0 | parts by weight |
| Coumarone resin | 2.5 | parts by weight |
| Sulphur | 2.0 | parts by weight |
| N-cyclohexyl-2-benzothiazole-sulpheneamide | 1.5 | parts by weight |

Using a speed of revolution of 212 rpm, the following mixing sequence is employed:

| | |
|---|---|
| Pulverulent filled rubber<br>Searic acid<br>Zinc oxide<br>Coumarone resin (finely ground)<br>Sulphur<br>N-cyclohexyl-2-benzothiazole-sulpheneamide | 0 seconds |
| Aromatic plasticizer oil (NAFTOLEN ® MV, prewarmed to 35° C.) | 5-60 seconds |
| Discharge of batch | 90 seconds |

The batch weight is 32.2 kg, the temperature of the material being mixed being 25° C. The current taken was 0.007 kWh/kg. The resulting finished mixture is still very free-flowing and is directly fed, in this form, to a special extruder of the "EVK 90" type, from Messrs. Werner & Pfleiderer. At a screw speed of 70 rpm, with a jacket temperature of 30° C. and a head temperature of 90° C., 540 kg per hour of extrudate (tire tread strip) are obtained in the form of a tire tread strip having a smooth glossy surface, the material temperature being 130° C.

(b) To compare the vulcanizate properties, a mixture of the same composition is employed, which has been prepared in accordance with the customary multi-stage mixing technique, usin a heavy internal mixer of the GK 160 type, starting from a rubber of the same type in bale form (SBR 1712) (Comparative Example A). The energy consumption (totalling 0.2 kWh/kg) was higher, by two powers of ten, than in the power mixing process; the temperature of the material being mixed was 160° C. after the first process stage (=base mixture, rubber and all additives, without cross-linking chemicals; mixing time 120 seconds; rotor speed 40 rpm), and 110° C. after the second process stage (=finished mixture; base mixture +chemicals; mixing time 75 seconds at 40 rpm). On extruding the hides, which had been cooled and divided into strips, as described under a), no differences in respect of the external nature of the extrudates were found, at the same output rate, relative to the products originating from pulverulent starting material.

(c) The vulcanization of the test specimens was carried out for 30 minutes at 150° C. The results are as follows:

|  | Comparison mixture obtained from solid rubber in bale form (Comparison Example A) | Mixtures obtained from pulverulent filled rubber, prepared according to Examples | | | |
|---|---|---|---|---|---|
|  |  | 1 | 2 | 3 | 4 |
| Tensile Strength (MPa) | 18.5 | 18.1 | 18.6 | 18.7 | 17.9 |
| Elongation at break (%) | 532 | 524 | 533 | 543 | 479 |
| Modulus at 300% elongation (MPa) | 9.9 | 9.7 | 9.4 | 9.6 | 10.4 |
| Hardness (°Sh A) | 65 | 65 | 64 | 64 | 66 |
| Elastic Revovery at 20° C. (%) | 28 | 27 | 26 | 27 | 28 |

The results show that the same quality as that obtained according to the prior art, starting from bale rubber, is achieved with substantially reduced expenditure on machinery and with a drastic savings of energy and time.

EXAMPLE 10 and COMPARISON EXAMPLE A

A finished mixture based on the formulation mentioned in Example 9 is prepared, in a single process stage, in an internal mixer of the "GK 160" type, from the pulverulent filled rubber prepared according to Example 6. At a rotor speed of 40 rpm and with a chamber temperature of 50° C., mixing is carried out along the lines of the upside-down process; that is, all the constituents of the mixture are introduced directly, at the beginning of the process, in the sequence: plasticizer oil, pulverulent filled rubber according to Example 6, and chemicals After applying the floating ram, the material undergoing mixing reaches a temperature of 105° C. after 45 seconds, and is discharged, at that point in time, as a compact finished mixture which neither chalks nor crumbles. On subsequently feeding the mixture onto a mill, a smooth hide which runs satisfactorily on the roll results. The mixture obtained is processed analogously to Example 9 to give extrudates (tire tread strips). A comparison of the properties (vulcanization for 30 minutes at 150° C.) with the comparison mixture described in Example 9 (Comparison Example A) obtained from bale rubber gives the following results:

|  | Comparison mixture obtained from solid rubber in bale form (Comparison Example A) | Mixture obtained from pulverulent filled rubber according to Example 6 |
|---|---|---|
| "GK 160"; 40 rpm; mixing time of first stage | 120 seconds |  |
| Discharge temperature | 160° C. | Not applicable |
| Energy, kWh/kg | 0.13 |  |
| Mixing time of second stage | 75 seconds | 45 seconds |
| Discharge temperature | 110° C. | 105° C. |
| Energy, kWh/kg | 0.07 | 0.06 |
| Tensile strength (MPa) | 18.5 | 19.1 |
| Elongation at break (%) | 532 | 566 |
| Modulus at 300% | 9.9 | 9.1 |
| elongation (MPa) |  |  |
| Hardness (°Sh A) | 65 | 65 |
| Elastic recovery at 20° C. (%) | 28 | 27 |

Compared to the effort entailed in mixing when starting from bale rubber, the use of pulverulent filled rubber according to Example 6 as the starting material results in a reduction in total mixing time and in energy expenditure to less than ½, while the end result is of the same quality.

EXAMPLES 11 to 14

Preparation of pulverulent filled rubbers from a rubber solution or rubber emulsion (a) Preparation of the aqueous filler suspension The aqueous filler suspension is prepared analogously to the description under (a) in Examples 1 to 8. Table 2 shows the nature and amount of the fillers.

(b) Preparation of the pulverulent filled rubber 700 kg of completely deionized water are introduced into a 3 m³ kettle equipped with an impeller stirrer. The filler is then introduced as an aqueous suspension, while stirring (at 50 rpm). Thereafter the acid (in the form of a 10 percent strength solution), the aluminum sulphate (in the form of a 20 percent strength solution) and the waterglass (in the form of a 26 percent strength solution) are added, in the manner and amount shown in Table 2. The filler suspension/precipitation liquor is then heated to the boiling point of the solvent of the rubber solution or emulsion. The pH is then adjusted with acid to the value shown in Table 2.

100 kg of rubber in the form of a solution or emulsion, of the solids content shown in Table 2, are introduced into this filler suspension/precipitation liquor in the course of 45 minutes, during which precipitation commences and the solvent evaporates off. At the same time the mixture is stirred at 70 rpm and, at the end of the precipitation, at 100 rpm, and the pH is kept at the value shown in Table 2 by addition of acid. While the rubber solution or emulsion is being introduced, the suspension becomes progressively more viscous.

After completion of the introduction of rubber solution or emulsion, the mixture is stirred for a further 5 minutes (at 50 rpm), after which it is cooled to room temperature, the product is separated from the water and the rubber powder suspension is dried with constant agitation. Powders which are very free-flowing and store well are obtained in the amounts shown in Table 2.

TABLE 2

| Example No. | 11 | 12 | 13 | 14 |
|---|---|---|---|---|
| (a) Preparation of the aqueous filler suspension | | | | |
| Completely deionized water, kg | 1620 | 1620 | 1520 | 1140 |
| Filler, type | Carbon black, ASTM No.N-220 | Carbon black, ASTM No.N-220 | Carbon black, ASTM No.N-220 | Carbon black, ASTM No.N-220 |
| kg | 85 | 85 | 80 | 60 |
| parts per hour | 85 | 85 | 80 | 60 |
| (b) Preparation of the pulverulent filled rubber | | | | |
| Acid type | Sulphuric acid | Sulphuric acid | Sulphuric acid | Sulphuric acid |
| kg (100% strength) | 0.5 | 0.5 | 0.75 | 1.0 |
| parts per hour | 0.5 | 0.5 | 0.75 | 1.0 |
| Aluminum type | Al sulphate | Al sulphate | Al sulphate | Al sulphate |
| salt kg (100% strength) | 2 | 2 | 2 | 4 |
| parts per hour | 2 | 2 | 2 | 4 |
| Waterglass kg (as $SiO_2$) | 1 | 1 | 2 | 2 |
| parts per hour (as $SiO_2$) | 1 | 1 | 2 | 2 |
| Temperature, °C | 70 | 70 | 70 | 80 |
| pH value | 3.4 | 3.4 | 3.4 | 3.4 |
| Rubber | Polybutadiene with 35% of 1,2-structures | Polybutadiene with 50% of 1,2-structures | L-SBR containing 20% of styrene | Polybutadiene with 98% of cis-1,4-structures |
| ML-4 | 85 | 85 | 85 | 50 |
| State | Solution | Solution | Solution | Emulsion, ratio of organic phase: aqueous phase = 1:1 |
| Solvent | Hexane | Hexane | Hexane | Benzene |
| Solids content % | 13 | 13 | 13 | 6.5 |
| Filled rubber kg | 179 | 181 | 175 | 154 |

EXAMPLE 15 and COMPARISON EXAMPLE B

A pulverulent finished mixture of the following composition is prepared, as described in Example 9 under (a), from the pulverulent filled rubber prepared according to Example 11:

| | |
|---|---|
| Pulverulent filled rubber | 180.0 parts by weight |
| Aromatic plasticizer oil | 50.0 parts by weight |
| Stearic acid | 2.5 parts by weight |
| Zinc oxide | 4.0 parts by weight |
| Coumarone resin | 2.5 parts by weight |
| Sulfur | 2.2 parts by weight |
| N-cyclohexyl-2-benzothiazole-sulphene-amide | 1.2 parts by weight |

The pulverulent finished mixture is charged onto a roll mill preheated to 50° C. A hide forms spontaneously. After runnin on the mill for 3 minutes samples are taken in order to prepare vulcanized specimens. The vulcanization of the specimens is carried out for 30 minutes at 150° C.

Comparison of the data with a mixture of the same composition prepared starting from a rubber of the same type in bale form (Comparison Example B, preparation of the comparison mixture analogous to Example 9, paragraph b) gives the following results:

| | Comparison mixture obtained from solid rubber in bale form (Comparison Example B) | Mixture obtained from pulverulent filled rubber prepared according to Example 11 |
|---|---|---|
| Tensile strength (MPa) | 14.8 | 15.1 |
| Elongation at break (%) | 493 | 502 |
| Modulus at 300% elongation (MPa) | 7.7 | 8.1 |
| Hardness (°Sh A) | 59 | 60 |
| Elastic recovery (%) | 22 | 22 |

Compared to the process technique using solid rubber, the use of pulverulent starting materials gives a substantial reduction in the mixing effort required, while the quality of the end result is the same.

The preceding examples can be prepared with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the precipitation of a pulverulent filled rubber, which consists essentially of mixing
    (a) a rubber latex;
    (b) a rubber solution; or
    (c) a rubber emulsion;
    with a filler suspension, waterglass and a water-soluble aluminum salt at a predetermined pH value of 3.0–3.7, the pH value being kept constant by introduction of acid during the precipitation,
    whereby the intermediate preparation of a stable mixture of (a), (b) or (c) with the filler suspension is avoided.

2. A process for preparing a pulverulent filled rubber which comprises carrying out the process of claim 1, distilling-off any rubber solvent, separating the pulverulent filled rubber from the water and drying the rubber.

3. The process of claim 2, wherein the solvent is distilled-off simultaneously with the precipitation.

4. The process of claim 1 which comprises preparing the filler suspension by suspending the filler in water and adding thereto the waterglass and aluminum salt, and adjusting the pH of the suspension to a predetermined value of 3.0–3.7 by addition of a mineral acid; and combining the rubber with the filler suspension while maintaining the pH at the predetermined value by addition of mineral acid.

5. The process of claim 1, wherein the filler is carbon black.

6. The process of claim 1, wherein aluminum sulphate is the water-soluble aluminum salt.

7. The process of claim 1, wherein the amount of filler is 20–400 weight parts per 100 weight parts of rubber if a carbon black filler is used, or is 20–500 weight parts per 100 weight parts of rubber if a mineral filler is used; the waterglass is a sodium silicate solution in which the molar ratio, $Na_2O:SiO_2$ is 2:1–1:4; the amount of waterglass is 0.5-6 weight percent (based on $SiO_2$) based on the total amount of rubber; and the amount of water soluble aluminum salt is 0.5–8 weight percent based on the total amount of rubber.

8. The pulverulent filled rubber prepared by the process of claim 1 or 2.

* * * * *